United States Patent
Shattah

(10) Patent No.: US 11,003,715 B2
(45) Date of Patent: May 11, 2021

(54) EQUIPMENT AND METHOD FOR HASH TABLE RESIZING

(71) Applicant: MELLANOX TECHNOLOGIES, LTD., Yokneam (IL)

(72) Inventor: Guy Shattah, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 334 days.

(21) Appl. No.: 16/132,549

(22) Filed: Sep. 17, 2018

(65) Prior Publication Data
US 2020/0089816 A1    Mar. 19, 2020

(51) Int. Cl.
*G06F 16/901* (2019.01)
*G06F 9/50* (2006.01)

(52) U.S. Cl.
CPC ........ *G06F 16/9014* (2019.01); *G06F 9/5016* (2013.01); *G06F 9/5022* (2013.01)

(58) Field of Classification Search
CPC .. G06F 16/9014; G06F 16/902; G06F 3/0647; G06F 3/065
USPC ........................................................ 707/747
See application file for complete search history.

(56) References Cited

U.S. PATENT DOCUMENTS

| | | |
|---|---|---|
| 6,611,875 B1 | 8/2003 | Chopra et al. |
| 6,957,215 B2 | 10/2005 | Stark |
| 7,051,078 B1 | 5/2006 | Cheriton |
| 7,054,315 B2 | 5/2006 | Liao |
| 7,061,874 B2 | 6/2006 | Merugu et al. |
| 7,116,663 B2 | 10/2006 | Liao |
| 7,234,019 B1 | 6/2007 | Kao et al. |
| 7,366,830 B1 | 4/2008 | Maheshwari |
| 7,394,809 B2 | 7/2008 | Kumar et al. |
| 7,426,518 B2 | 9/2008 | Venkatachary et al. |
| 7,804,699 B2 | 9/2010 | Gupta et al. |
| 7,933,282 B1 | 4/2011 | Gupta et al. |
| 8,271,564 B2 | 9/2012 | Dade et al. |
| 8,290,934 B2 | 10/2012 | Stergiou et al. |
| 8,305,271 B2 | 11/2012 | Li et al. |
| 8,429,143 B2 | 4/2013 | Ellison et al. |

(Continued)

OTHER PUBLICATIONS

U.S. Appl. No. 15/469,530 office action dated Dec. 14, 2018.

(Continued)

*Primary Examiner* — Robert W Beausoliel, Jr.
*Assistant Examiner* — Pedro J Santos
(74) *Attorney, Agent, or Firm* — Kligler & Associates Patent Attorneys Ltd

(57) ABSTRACT

A method for optimizing hash table lookup speed during hash table resize on a computing device, the method including performing the following on the computing device: providing a first hash table having N slots for entries, designating the first hash table as an active hash table, allocating a second hash table, and performing the following after allocating the second hash table: when a hash table insertion of an entry is requested, performing insertion by inserting the entry to the first hash table and inserting the entry to the second hash table, and when a hash table lookup is requested, looking up the requested entry in the active hash table, one of the performing insertion and the performing deletion including also copying K entries, K being greater than or equal to 1, from the first hash table to the second hash table. Related apparatus and methods are also described.

17 Claims, 5 Drawing Sheets

(56) References Cited

U.S. PATENT DOCUMENTS

| | | | |
|---|---|---|---|
| 8,462,786 | B2 | 6/2013 | Liu et al. |
| 8,468,296 | B1 | 6/2013 | Cohen |
| 8,619,766 | B2 | 12/2013 | Wang et al. |
| 8,650,209 | B1 | 2/2014 | Shattah et al. |
| 8,806,175 | B2 | 8/2014 | Beaman et al. |
| 8,856,203 | B1 | 10/2014 | Schelp et al. |
| 8,938,469 | B1* | 1/2015 | Keen .................. H04L 45/7453 707/769 |
| 9,098,601 | B2 | 8/2015 | Wang |
| 9,111,615 | B1 | 8/2015 | Jiang |
| 9,171,030 | B1 | 10/2015 | Arad et al. |
| 9,223,711 | B2 | 12/2015 | Philip et al. |
| 9,245,626 | B2 | 1/2016 | Fingerhut et al. |
| 9,262,312 | B1 | 2/2016 | Gazit et al. |
| 9,317,517 | B2 | 4/2016 | Attaluri et al. |
| 9,344,366 | B2 | 5/2016 | Bouchard et al. |
| 9,406,381 | B2 | 8/2016 | Akerib et al. |
| 9,424,366 | B1 | 8/2016 | Gazit et al. |
| 9,438,505 | B1 | 9/2016 | Zhou et al. |
| 9,543,015 | B1 | 1/2017 | Roy |
| 9,569,561 | B2 | 2/2017 | Wildman et al. |
| 9,627,063 | B2 | 4/2017 | Dharmapurikar |
| 9,659,046 | B2 | 5/2017 | Sen et al. |
| 9,704,574 | B1 | 7/2017 | Shamis |
| 9,779,123 | B2 | 10/2017 | Sen et al. |
| 9,785,666 | B2 | 10/2017 | Li et al. |
| 9,866,479 | B2 | 1/2018 | Wang et al. |
| 9,892,057 | B2 | 2/2018 | Levy et al. |
| 9,984,144 | B2 | 5/2018 | Levy et al. |
| 10,049,126 | B2 | 8/2018 | Levy et al. |
| 10,068,034 | B2 | 9/2018 | Levy et al. |
| 2002/0089937 | A1 | 7/2002 | Venkatachary et al. |
| 2003/0123459 | A1 | 7/2003 | Liao |
| 2004/0100950 | A1 | 5/2004 | Basu et al. |
| 2006/0209725 | A1 | 9/2006 | Cadambi et al. |
| 2008/0192754 | A1 | 8/2008 | Ku et al. |
| 2008/0228691 | A1 | 9/2008 | Shavit et al. |
| 2008/0259667 | A1 | 10/2008 | Wickeraad |
| 2010/0080223 | A1 | 4/2010 | Wong et al. |
| 2010/0269024 | A1 | 10/2010 | Hao et al. |
| 2012/0054467 | A1* | 3/2012 | Fulton ................ G06F 16/9014 711/216 |
| 2012/0137060 | A1 | 5/2012 | Akerib et al. |
| 2012/0275466 | A1 | 11/2012 | Bhadra et al. |
| 2013/0311492 | A1 | 11/2013 | Calvignac et al. |
| 2014/0006706 | A1 | 1/2014 | Wang |
| 2014/0089498 | A1 | 3/2014 | Goldfarb et al. |
| 2014/0201307 | A1 | 7/2014 | Banavalikar et al. |
| 2014/0215144 | A1 | 7/2014 | Valency et al. |
| 2014/0310307 | A1 | 10/2014 | Levy et al. |
| 2015/0058595 | A1 | 2/2015 | Gura et al. |
| 2015/0127900 | A1 | 5/2015 | Dharmapurikar et al. |
| 2015/0207735 | A1 | 7/2015 | Kuramoto |
| 2015/0242429 | A1 | 8/2015 | Varvello et al. |
| 2015/0244842 | A1 | 8/2015 | Laufer et al. |
| 2016/0202932 | A1 | 7/2016 | Kadu |
| 2016/0294625 | A1 | 10/2016 | Mahkonen et al. |
| 2016/0330301 | A1 | 11/2016 | Raindel et al. |
| 2017/0046395 | A1 | 2/2017 | Li et al. |
| 2017/0053012 | A1 | 2/2017 | Levy et al. |
| 2017/0147254 | A1 | 5/2017 | Adams et al. |
| 2017/0195253 | A1 | 7/2017 | Annaluru et al. |
| 2017/0346765 | A1 | 11/2017 | Immidi |
| 2018/0278525 | A1 | 9/2018 | Levy et al. |
| 2019/0036821 | A1 | 1/2019 | Levy et al. |

OTHER PUBLICATIONS

Che et al., "DRES: Dynamic Range Encoding Scheme for TCAM Coprocessors", IEEE Transactions on Computers, vol. 57, No. 7, pp. 902-915, Jul. 2008.

Liu et al., "TCAM Razor: A Systematic Approach Towards Minimizing Packet Classifiers in TCAMs", IEEE/ACM Transactions on Networking, vol. 18, No. 2, pp. 490-500, Apr. 2010.

Liu et al., "All-Match Based Complete Redundancy Removal for Packet Classifiers in TCAMs", Proceedings of IEEE 27th Conference on Computer Communications (INFOCOM 2008), pp. 574-582, Apr. 13-18, 2008.

Liu et al., "Complete Redundancy Removal for Packet Classifiers in TCAMs", IEEE Transactions on Parallel and Distributed Systems, vol. 21, No. 4, pp. 424-437, Apr. 2010.

Taylor et al., "Scalable Packet Classification using Distributed Crossproducting of Field Labels", IEEE INFOCOM, pp. 1-12, 2005.

U.S. Appl. No. 15/663,758 office action dated Mar. 28, 2019.

U.S. Appl. No. 14/827,402 office action dated Apr. 16, 2019.

Hua et al., "Variable-Stride Multi-Pattern Matching for Scalable Deep Packet Inspection", IEEE INFOCOM , pp. 415-423, Rio de Janeiro, Brazil, Apr. 19-25, 2009.

Lakshminarayanan et al., "Algorithms for advanced packet classification with ternary CAMs", Proceedings of the 2005 conference on Applications, technologies, architectures, and protocols for computer communications (SIGCOMM 05), pp. 193-204, Aug. 21-26, 2005.

Pagh, R., "Cuckoo Hashing for Undergraduates", IT University of Copenhagen, 6 pages, Mar. 27, 2006.

Pagh et al., "Cuckoo Hashing", Journal of Algorithms, vol. 51, pp. 122-144, May 2004.

Kirsch et al., "Less Hashing, Same Performance: Building a Better Bloom Filter", Random Structures and Algorithms, vol. 33, issue 2, pp. 187-218, Sep. 2008.

Kirsch et al., "More Robust Hashing: Cuckoo Hashing with a Stash", SIAM Journal on Computing, vol. 39, Issue 4, pp. 1543-1561, Sep. 2009.

Patrow, A., "General Purpose Hash Function Algorithms", 6 pages, year 2000 http://www.partow.net/programming/hashfunctions/.

Laurence et al., "Spam Based Architecture for tcam for Low Area and Less Power Consumption", ARPN Journal of Engineering and Applied Sciences, vol. 10, No. 17, pp. 7607-7612, Sep. 2015.

Song et al., "Fast Hash Table Lookup Using Extended Bloom Filter: An Aid to Network Processing", Proceedings of SIGCOMM Conference, Philadelphia, USA, pp. 181-192, Aug. 21-26, 2005.

Waldvogel et al., "Scalable High-Speed Prefix Matching", ACM Transactions on Computer Systems (TOCS), vol. 19, Issue 4, pp. 440-482, Nov. 2001.

Vamanan et al., "EffiCuts: optimizing packet classification for memory and throughput", Proceedings of the SIGCOMM conference, New Delhi, India, pp. 207-218, Aug. 30-Sep. 3, 2010.

Singh et al., "Packet classification using multidimensional cutting", Proceedings of SIGCOMM Conference, Karlsrube, German, pp. 213-224, Aug. 25-29, 2003.

Taylor et al., "ClassBench: a packet classification benchmark", WUCSE-2004-28, Applied Research Laboratory Department of Computer Science and Engineering, Washington University, Saint Louis, USA, 37 pages, May 21, 2004.

Demetriades et al., "An Efficient Hardware-basedMulti-hash Scheme for High Speed IP Lookup", 16th IEEE Symposium on High Performance Interconnects, pp. 103-110, Aug. 26-28, 2008.

Meiners et al., "Algorithmic Approaches to Redesigning TCAM-Based Systems", Proceedings of the 2008 ACM SIGMETRICS international conference on Measurement and modeling of computer systems (SIGMETRICS '08), pp. 467-468, Jun. 2-6, 2008.

Kasnavi et al., "A cache-based internet protocol address lookup architecture", Computer Networks, vol. 52 , pp. 303-326, year 2008.

Matousek, et al., "ClassBench-ng: Recasting ClassBench After a Decade of Network Evolution", Proceedings of the Symposium on Architectures for Networking and Communications Systems (ANCS '17) ,13 pages, May 2017.

Hash Tables—Wikibooks, 'Data Structures/Hash Tables', 27 pages, Jul. 15, 2018 https://en.wikibooks.org/wiki/Data_Structures/Hash_Tables#Table_resizing.

Hash Table—Wikipedia—15 pages, Jul. 19, 2018 https://en.wikipedia.org/w/index.php?title=Hash_table&oldid=851008087.

Hashtable—kkarad/refresh Wiki—GitHub, 2 pages, Sep. 2, 2014 https://github.com/kkarad/refresh/wiki/Hashtable.

(56) References Cited

OTHER PUBLICATIONS

Pike et al., "Parallel Space-Efficient Hash Table Resize", Technical Disclosure Commons, Defensive Publications Series, 11 pages, Mar. 23, 2015.
Williams et al., "Five Myths about Hash Tables", Blog at WordPress.com, 15 pages, Oct. 1, 2012.
Levy et a;., U.S. Appl. No. 16/052,646, filed Aug. 2, 2018.
U.S. Appl. No. 16/559,658 office action dated Jul. 23, 2020.
Xu et al., "A Novel Hash-based Packet Classification Algorithm," 5th International Conference on Information Communications & Signal Processing, pp. 1504-1508, Dec. 2005.
U.S. Appl. No. 16/559,658 Office Action dated Nov. 25, 2020.
Pontarelli et al., "Parallel d-Pipeline: A Cuckoo Flashing Implementation for Increased Throughput", IEEE Transactions on Computers, vol. 65, No. 1, pp. 326-331, Jan. 2016.
Reviriego et al., "Energy Efficient Exact Matching for Flow Identification with Cuckoo Affinity Hashing", IEEE Communications Letters, vol. 18, No. 5, pp. 885-888, May 2014.
Pontarelli et al., "Cuckoo Cache: A Technique to Improve Flow Monitoring Throughput", IEEE Internet Computing, vol. 20, issue 4, pp. 1-11, Jul.-Aug. 2016.
Zhou et al., "Scalable, High Performance Ethernet Forwarding with CUCKOOSWITCH", CoNEXT '13, pp. 1-12, Santa Barbara, USA, Dec. 9-12, 2013.
U.S. Appl. No. 16/052,646 Office Action dated Mar. 19, 2021.

* cited by examiner

EQUIPMENT AND METHOD FOR HASH TABLE RESIZING

FIELD OF THE INVENTION

The present invention relates to methods and apparatus for optimizing performance of computing equipment when using hash tables, and particularly but not exclusively to methods and apparatus for optimizing performance of computing equipment when using hash tables in a context where lookup operations are common.

BACKGROUND OF THE INVENTION

Computing equipment using hash tables is well known. When a hash table reaches a certain level of being full (that is, when a certain percentage of the available slots in the hash table become occupied as entries are added to the hash table) it is conventional to increase the size of the hash table in some way so that the hash table can continue to be used. Likewise, it might be appropriate to reduce the size of a hash table when the hash table reaches a certain level of being empty (that is, when a certain percentage of the available slots in the hash table become unoccupied as entries are deleted from the hash table). Various ways of increasing and/or reducing the size of a hash table are known.

One known way of increasing the size of a hash table is described in the Wikibooks reference Data Structures/Hash Tables, found on the World Wide Web at en.wikibooks.org/wiki/Data_Structures/Hash_Tables. As described in that reference, particularly in real-time systems it is not appropriate to pay a performance price during hash table enlargement. To overcome that problem, the reference suggests that:

- a new hash table be allocated, leaving the old hash table in place and checking both hash tables during lookups
- when an insertion is performed, the inserted record is added to the new hash table, and in addition a certain number of elements (k) are moved from the old table to the new table
- once all elements have been removed from the old table, the old table is deallocated
- to prevent a situation wherein the new table requires enlargement before all of the old table elements have been completely copied over, the size of the new table relative to the old table must be at least (k+1)/k times that size of the old table

SUMMARY OF THE INVENTION

The present invention, in certain embodiments thereof, seeks to provide improved methods and apparatus for optimizing performance of computing equipment when using hash tables.

The inventor of the present invention believes that the known methods of and apparatus for using hash tables with computing equipment, and particularly though not exclusively the known methods for increasing and/or reducing the size of a hash table, may be less than optimal. The lack of optimality may particularly, but not exclusively, arise when lookup operations in the hash table are common.

Throughout the present specification and claims, the term "resize", in its various grammatical forms, is used in general to refer to increasing and/or reducing the size of a hash table.

There is thus provided in accordance with an exemplary embodiment of the present invention a method for optimizing hash table lookup speed during hash table resize on a computing device, the method including performing the following on the computing device: providing a first hash table having N slots for entries, designating the first hash table as an active hash table, allocating a second hash table, and performing the following after allocating the second hash table: when a hash table insertion of an entry is requested, performing insertion by inserting the entry to the first hash table and inserting the entry to the second hash table, and when a hash table lookup is requested, looking up the requested entry in the active hash table, one of the performing insertion and the performing deletion including also copying K entries, K being greater than or equal to 1, from the first hash table to the second hash table.

Further in accordance with an exemplary embodiment of the present invention the performing the following after allocating the second hash table also includes, when a hash table deletion of an entry is requested, performing deletion by deleting the entry from the first hash table and deleting the entry from the second hash table.

Still further in accordance with an exemplary embodiment of the present invention the second hash table has at least 2N+1 slots for entries.

Additionally in accordance with an exemplary embodiment of the present invention the method also includes providing a threshold occupancy level of slots for the first hash table, wherein the second hash table is allocated in response to a present occupancy level of the first hash table exceeding the threshold occupancy level, and the second hash table has more than N slots for entries.

Moreover in accordance with an exemplary embodiment of the present invention the method also includes providing an enlargement ratio e, wherein the threshold occupancy level is approximately equal to N multiplied by the enlargement ratio e.

Further in accordance with an exemplary embodiment of the present the second hash table has approximately $$1 + \frac{1}{e} * N$$

entries.

Further in accordance with an exemplary embodiment of the present invention the method also includes providing a threshold occupancy level of slots for the first hash table, wherein the second hash table is allocated in response to a present occupancy level of the first hash table reaching a level less than the threshold occupancy level, and the second hash table has fewer than N slots for entries.

Still further in accordance with an exemplary embodiment of the present invention the method also includes providing a diminution ratio d, wherein the threshold occupancy level is approximately equal to N multiplied by the diminution ratio d.

Additionally in accordance with an exemplary embodiment of the present invention the second hash table has approximately $$d*N$$

entries.

Moreover in accordance with an exemplary embodiment of the present the performing the following further includes when a number of entries in the first hash table and a number of entries in the second hash table are equal, designating the second hash table as the active hash table and ceasing to designate the first hash table as the active hash table.

Further in accordance with an exemplary embodiment of the present invention the method includes after the designating the second hash table as the active hash table, deallocating the first hash table.

There is also provide in accordance with another exemplary embodiment of the present invention a computing device including a processing unit, and memory for storing a first hash table having N slots for entries, the processing unit being configured for designating the first hash table as an active hash table, allocating a second hash table, and performing the following after allocating the second hash table: when a hash table insertion of an entry is requested, performing insertion by inserting the entry to the first hash table and inserting the entry to the second hash table, and when a hash table lookup is requested, looking up the requested entry in the active hash table, one of the performing insertion and the performing deletion including also copying K entries, K being greater than or equal to 1, from the first hash table to the second hash table.

Further in accordance with an exemplary embodiment of the present invention the performing the following after allocating the second hash table also includes when a hash table deletion of an entry is requested, performing deletion by deleting the entry from the first hash table and deleting the entry from the second hash table.

Still further in accordance with an exemplary embodiment of the present invention the second hash table has at least 2N+1 slots for entries.

Additionally in accordance with an exemplary embodiment of the present invention the processing unit is also configured for providing a threshold occupancy level of slots for the first hash table, wherein the second hash table is allocated in response to a present occupancy level of the first hash table exceeding the threshold occupancy level, and the second hash table has more than N slots for entries.

Moreover in accordance with an exemplary embodiment of the present invention the processing unit is also configured for providing an enlargement ratio e, wherein the threshold occupancy level is approximately equal to N multiplied by the enlargement ratio e.

Further in accordance with an exemplary embodiment of the present invention the second hash table has approximately $$1 + \frac{1}{e} * N$$

entries.

Still further in accordance with an exemplary embodiment of the present invention the processing unit is also configured for providing a threshold occupancy level of slots for the first hash table, wherein the second hash table is allocated in response to a present occupancy level of the first hash table reaching a level less than the threshold occupancy level, and the second hash table has fewer than N slots for entries.

Additionally in accordance with an exemplary embodiment of the present invention the processing unit is also configured for providing an diminution ratio d, wherein the threshold occupancy level is approximately equal to N multiplied by the diminution ratio d.

Moreover in accordance with an exemplary embodiment of the present invention the second hash table has approximately $$d*N$$

entries.

Further in accordance with an exemplary embodiment of the present invention the performing the following after allocating the second hash table further includes when a number of entries in the first hash table and a number of entries in the second hash table are equal, designating the second hash table as the active hash table and ceasing to designate the first hash table as the active hash table.

Still further in accordance with an exemplary embodiment of the present invention the performing the following after allocating the second hash table further includes after the designating the second hash table as the active hash table, deallocating the first hash table.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
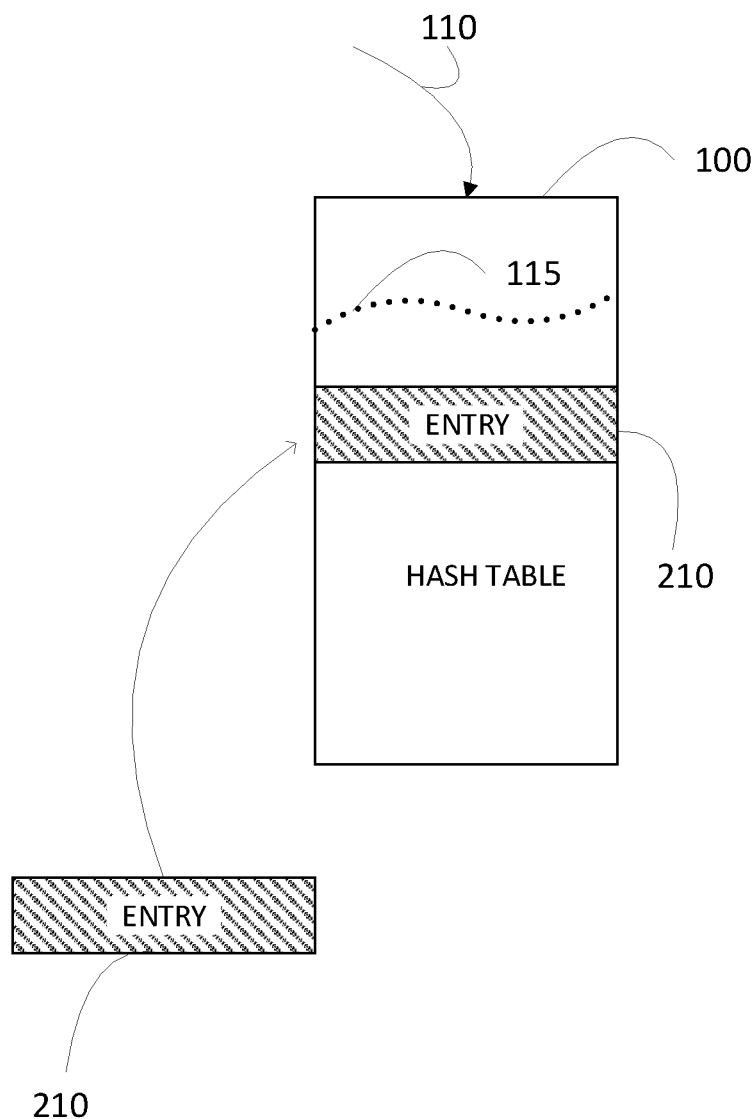
FIG. 1 is a simplified pictorial illustration of computing equipment comprising a hash table, constructed and operative in accordance with an embodiment of the present invention.

Reference is now made to FIG. 1 which is a simplified pictorial illustration of computing equipment comprising a hash table, constructed and operative in accordance with an embodiment of the present invention.

The computing equipment of FIG. 1 (which is not explicitly shown), may be any appropriate computing equipment. One particular non-limiting example of computing equipment which may use a hash table, in which using various embodiments of the present invention with the goal of optimizing performance may be useful, is described in US Published Patent Application 2016/0330301 of Mellanox Technologies, Ltd.

In FIG. 1, a hash table 100, instantiated in the computing equipment (not shown), is depicted. The hash table 100, which may comprise any appropriate hash table as is well known in the art, is pointed to by an active hash table pointer 110, indicating that the hash table 100 is an active hash table.

In FIG. 1 an entry 210 is shown being inserted in the hash table 100. As is well known in the art, when the entry 210 is to be inserted, a hash function h associated with the hash table 100 is applied to all or part of the entry 210; the resulting value of the hash function h determines a position within the hash table 100 at which the entry 210 is inserted.

Similarly, when an entry is looked up (not shown) in the hash table 100, the hash function h is applied to the value which is to be looked up in the hash table 100, thereby determining a position within the table. If an entry is found at the position, then that is the entry which was to be looked up; if no entry is found at the position, then no such entry is found in the hash table 100.

Persons skilled in the art will appreciate that, for the sake of simplicity of depiction and description, not all details of use of hash tables are described herein; rather, those details which are relevant to embodiments described and claimed herein are described. For example, and without limiting the generality of the foregoing, well-known techniques for dealing with hash collision are not described herein.

Also shown in hash table 100 is a schematically-depicted threshold level 115. As described in more detail below, it may be appropriate to allocate a hash table of increased size at or after a time when the hash table 100 becomes full up to the schematically-depicted threshold level 115. The following computation provides one non-limiting example of determining an appropriate threshold level 115:

Assume that the hash table 100 can hold N entries.
Define an enlargement ratio ratio_enlarge, such that 0<ratio_enlarge<1, ratio_enlarge may be defined in advance of use of the hash table 100, or may be changed during use of the hash table 100, ratio_enlarge is also termed herein e.
The threshold level 115 may then have a value threshold_enlarge=N*ratio_enlarge (or threshold_enlarge may be an integer close to N*ratio_enlarge).

The threshold level 115 is also termed herein a "threshold occupancy level".

Figure 2:
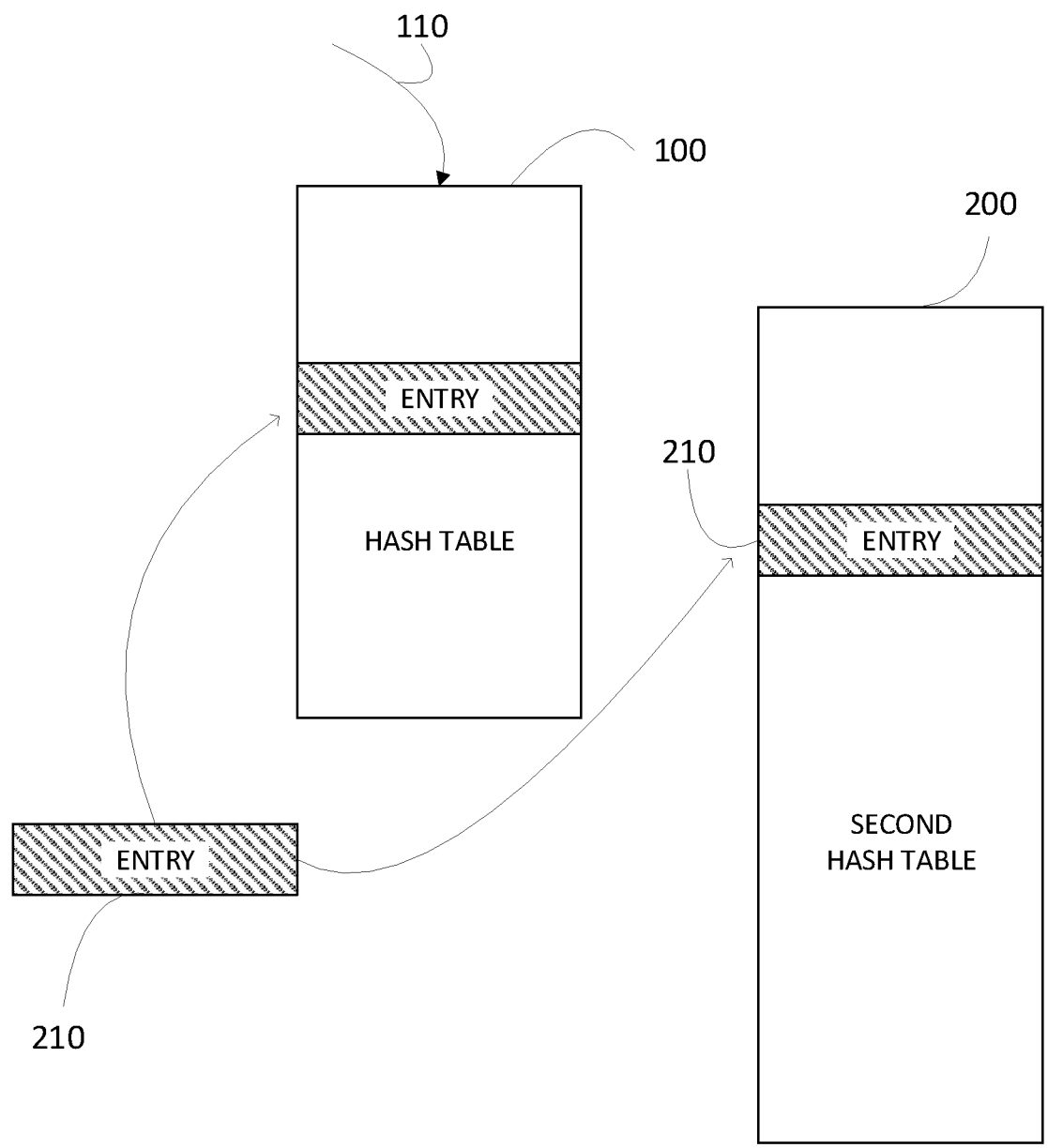
FIG. 2 is a simplified pictorial illustration of the computing equipment comprising a hash table of FIG. 1, depicting an operation taking place after a hash table of increased size has been allocated.

Reference is now additionally made to FIG. 2, which is a simplified pictorial illustration of the computing equipment comprising a hash table of FIG. 1, depicting an operation taking place after a hash table of increased size has been allocated. In FIG. 2, a second hash table 200 of increased size is shown. It may be appropriate to allocate the second hash table 200 at or after a time when the hash table 100 becomes full up to the schematically-depicted threshold level 115, as described above.

The second hash table 200 may have a size given by at least:

$$1 + \frac{1}{e} * N$$

entries, and in any case, greater than N+1 entries. In some embodiments, it may be advantageous for the second hash table to have a size (number of slots) sufficient to hold at least 2N+1 entries.

Once the second hash table 200 has been allocated, when a further entry such as entry 210 is to be added, the entry 210 is added both to the hash table 100 (which is still the active hash table, pointed to by the active hash table pointer 110), and to the second hash table 200. It will be appreciated that, in general, a first hash function h1 may be used for the hash table 100 while a second hash function h2 may be used for the second hash table 200. (Alternatively, the functions h1 and h2 may be identical). Thus, persons skilled in the art will appreciate that "extra" computation takes place in the phase shown in FIG. 2, a phase in which entries are added to both the hash table 100 and the second hash table 200.

Similarly (not shown), if an entry is to be deleted, then the entry is deleted both from the hash table 100 and from the second hash table 200. Again, it will be appreciated that, in general, a first hash function h1 may be used for the hash table 100 while a second hash function h2 may be used for the second hash table 200. Thus, persons skilled in the art will appreciate that "extra" computation takes place in the phase shown in FIG. 2, a phase in which entries are deleted from both the hash table 100 and the second hash table 200.

Figure 3:
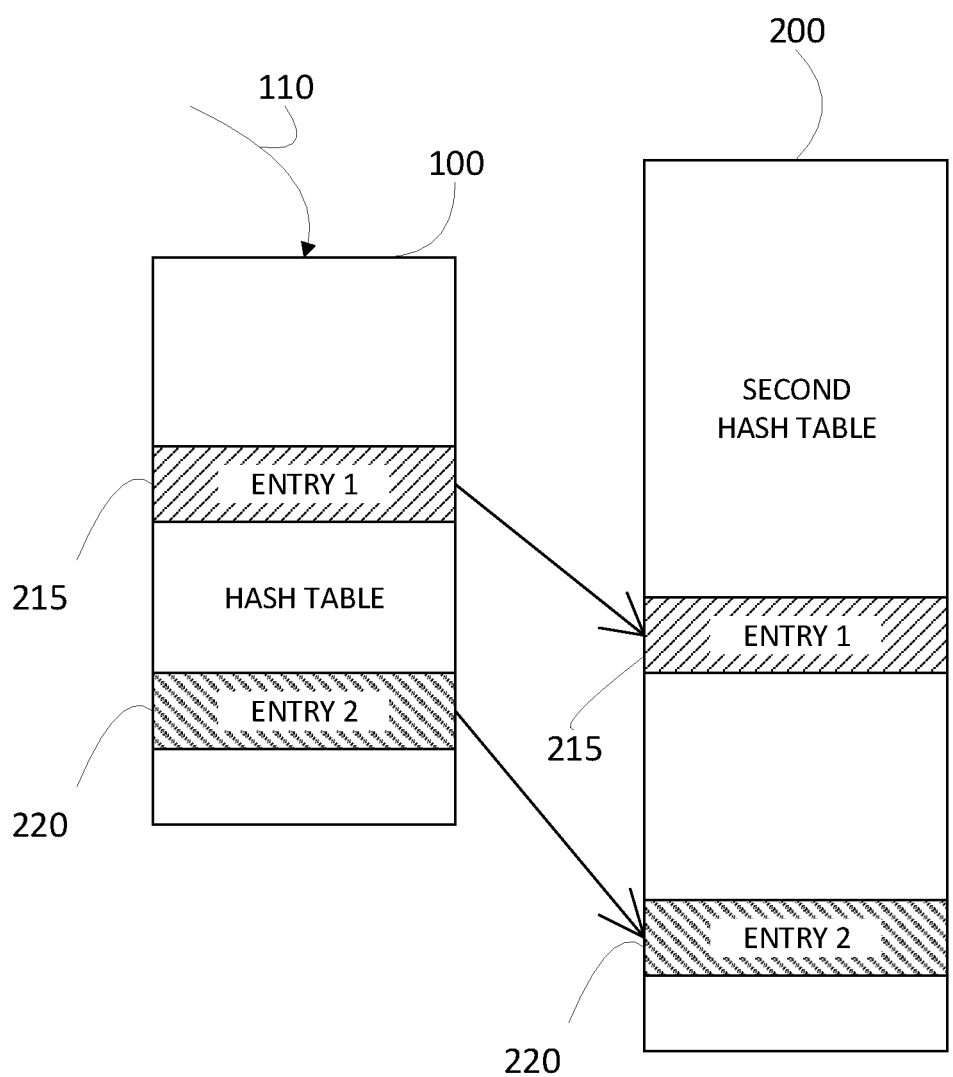
FIG. 3 is a simplified pictorial illustration of the computing equipment comprising a hash table of FIG. 1, depicting a further operation taking place after a hash table of increased size has been allocated.

Reference is now made to FIG. 3, which is a simplified pictorial illustration of the computing equipment comprising a hash table of FIG. 1, depicting a further operation taking place after a hash table of increased size has been allocated. In embodiments of the present invention, when an entry is added to the hash table 100 and to the second hash table 200 (or when an entry is deleted from the hash table 100 and from the second hash table 200), a further operation takes place. In the further operation, depicted in FIG. 3, one or more entries (shown in FIG. 3, for ease of depiction and by way of strictly non-limiting example only, as two entries 215 and 220) are copied from the hash table 100 to the second hash table 200. As with addition of entries, it will be appreciated that, in general, a first hash function h1 may be used for the hash table 100 while a second hash function h2 may be used for the second hash table 200 (Alternatively, the functions h1 and h2 may be identical). Thus, the value of the second hash function h2 will be computed accordingly, adding "extra" computation to the operation shown in FIG. 3.

The number of entries copied as described above from the hash table 100 to the second hash table 200 may be, by way of non-limiting example, given by the following formula (rounded up to the nearest integer):

$$\frac{1}{1 - \text{ratio\_enlarge}} - 1$$

In general, it may be that at least that number of entries may be copied.

Thus, in general, a single insertion will result in one entry being inserted into the hash table 100 (the active hash table), and to the insertion of a total of at least $$\frac{1}{1 - \text{ratio\_enlarge}}$$

entries into the second hash table 200.

Persons skilled in the art will appreciate that, as depicted in FIG. 2 and in FIG. 3, when a lookup of an entry occurs, the lookup may occur only in the hash table 100, and no operation need be performed on the second hash table 200 in order to perform a lookup. As persons skilled in the art will appreciate, the operations depicted in FIGS. 1-3 leave the hash table 100 in a state in which it is unnecessary to perform a lookup in the second hash table 200, since all (non-deleted) entries are found in the hash table 100. Thus, while (as described above and depicted in FIG. 2 and in FIG. 3) "extra" computation takes place for insertion and for deletion, no "extra" computation takes place for lookup. In this sense, inter alia, the operation of the computing apparatus of FIGS. 1-3 is optimized in situations in which lookups are relatively common compared to insertions and deletions.

Figure 4:
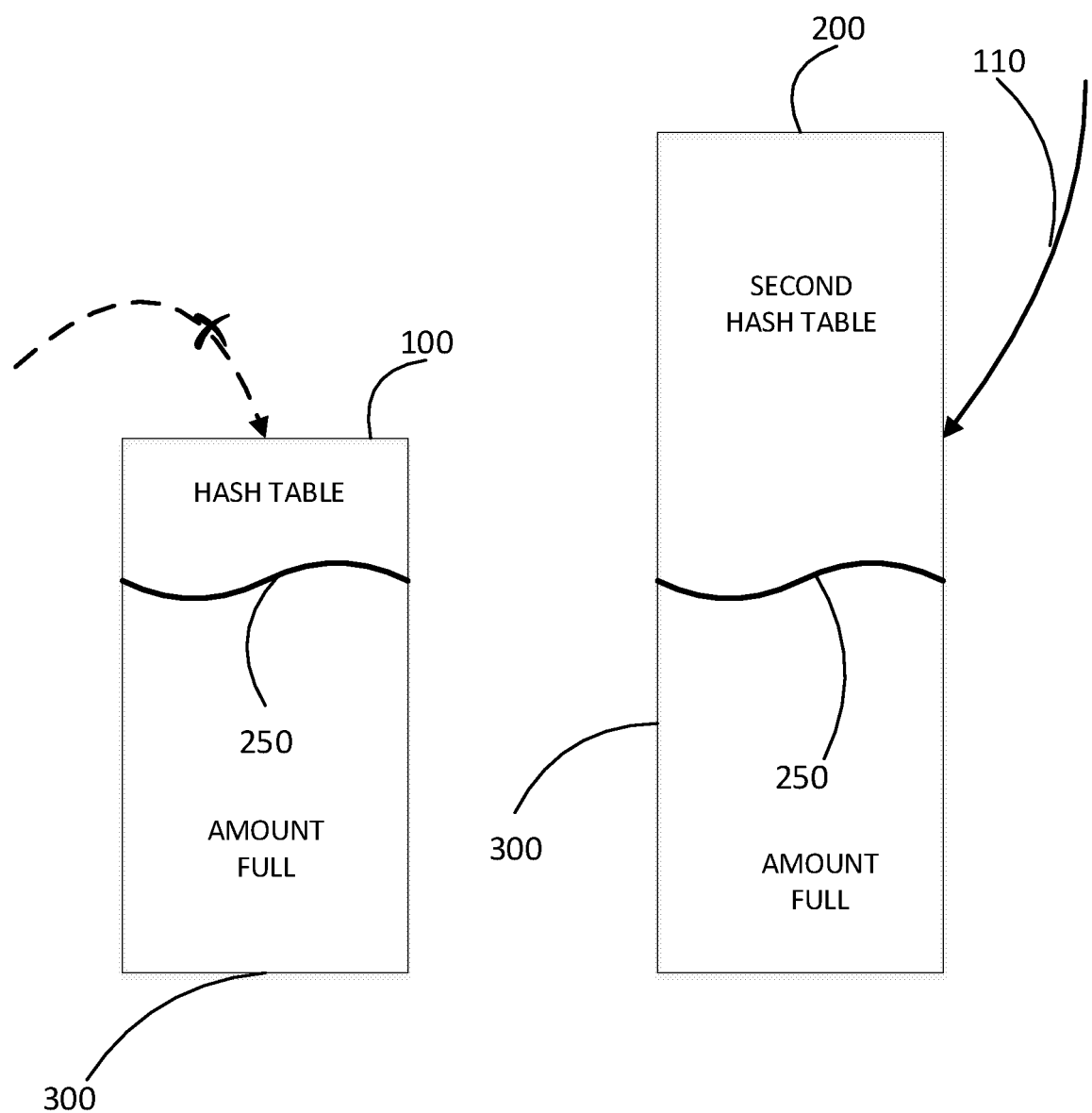
FIG. 4 is a simplified pictorial illustration of the computing equipment comprising a hash table of FIG. 1, depicting an operation in which a new hash table becomes active in place of an existing hash table.

Reference is now made to FIG. 4, which is a simplified pictorial illustration of the computing equipment comprising a hash table of FIG. 1, depicting an operation in which a new hash table becomes active in place of an existing hash table. When or after the second hash table 200 has the same number of entries as, or more entries than, the hash table 100, the second hash table 200 becomes the active hash table. This situation is depicted schematically in FIG. 4. A "high water mark" 250 is shown for each of the hash table 100 and the second hash table 200, with an amount full (not intended to depict a percentage full) 300 of the hash table 100 being the same as the amount full 300 of the second hash table 200. At this point the active hash table pointer 110 which formerly pointed to the hash table 100 (the "formerly pointed" situation being depicted schematically by a dashed arrow) is replaced so that the active hash table pointer 110 now points to the second hash table 200.

The operation by which the active hash table pointer 110 ceases to point at the hash table 100 and begins to point at the second hash table 200 is an atomic operation. The term "atomic operation", as used throughout the present specification and claims in all its grammatical forms, denotes a situation in which from the time that an operation begins until the time that the operation ends, no other related operation may take place. By way of strictly non-limiting example, changing the active hash table pointer is an atomic operation in that from the time redirection of the active hash table pointer 110 from the hash table 100 to the second hash table 200 begins until the time that the redirection ends, no other related operation of lookup in, addition to, or deletion from the hash table 100 or the second hash table 200 may take place. For the sake of simplicity of depiction and description, specific mechanisms known in the art for ensuring that an operation is an atomic operation are neither described nor shown herein; persons skilled in the art may choose any appropriate such mechanism.

Specific non-limiting examples of allocation of the second hash table 200 are now provided (referring back to all of FIGS. 1-4).

In one specific non-limiting example, ratio_enlarge could be equal to ½. In this example, once the hash table 100 has N/2 entries (the threshold occupancy level), the second hash table 200 with size 4N is allocated. Thereafter, on each insertion to the hash table 100, two items are copied from the hash table 100 to the second hash table 200. Persons skilled in the art will appreciate that after N/2 insertions to the hash table 100 (following beginning copying of items from the hash table 100 to the second hash table 200) the second hash table 200 contains N entries and the active hash table pointer 110 is changed to point to the second hash table 200, as described above.

In a second specific non-limiting example, ratio_enlarge could be equal to ⅔. In this example, once the hash table 100 has 2N/3 entries (the threshold occupancy level), the second hash table 100 is allocated; the second hash table 100 (in this example) may be allocated with size 5N. Thereafter, on each insertion to the hash table 100, in this example 3 items are copied to the second hash table 200. After N/3 insertions to the hash table 100 (following beginning copying of items from the hash table 100 to the second hash table 200) the second hash table 200 contains N entries and the active hash table pointer 100 is changed to point to the second hash table 200, as described above. In this example, considering the possibility that deletions also occur, if there have been some deletions from the hash table 100, the deleted items are either removed also from the second hash table 200 (if those items were copied thereto) or alternatively may not be copied to the second hash table 200 at all.

Generally, the above description relates to increasing the size of a hash table as entries are added to the hash table and the hash table becomes "full". Persons skilled in the art will appreciate that similar principles could apply, mutatis mutandis, to reducing the size of a hash table as entries are deleted from a hash table and the hash table becomes "empty".

Figure 5:
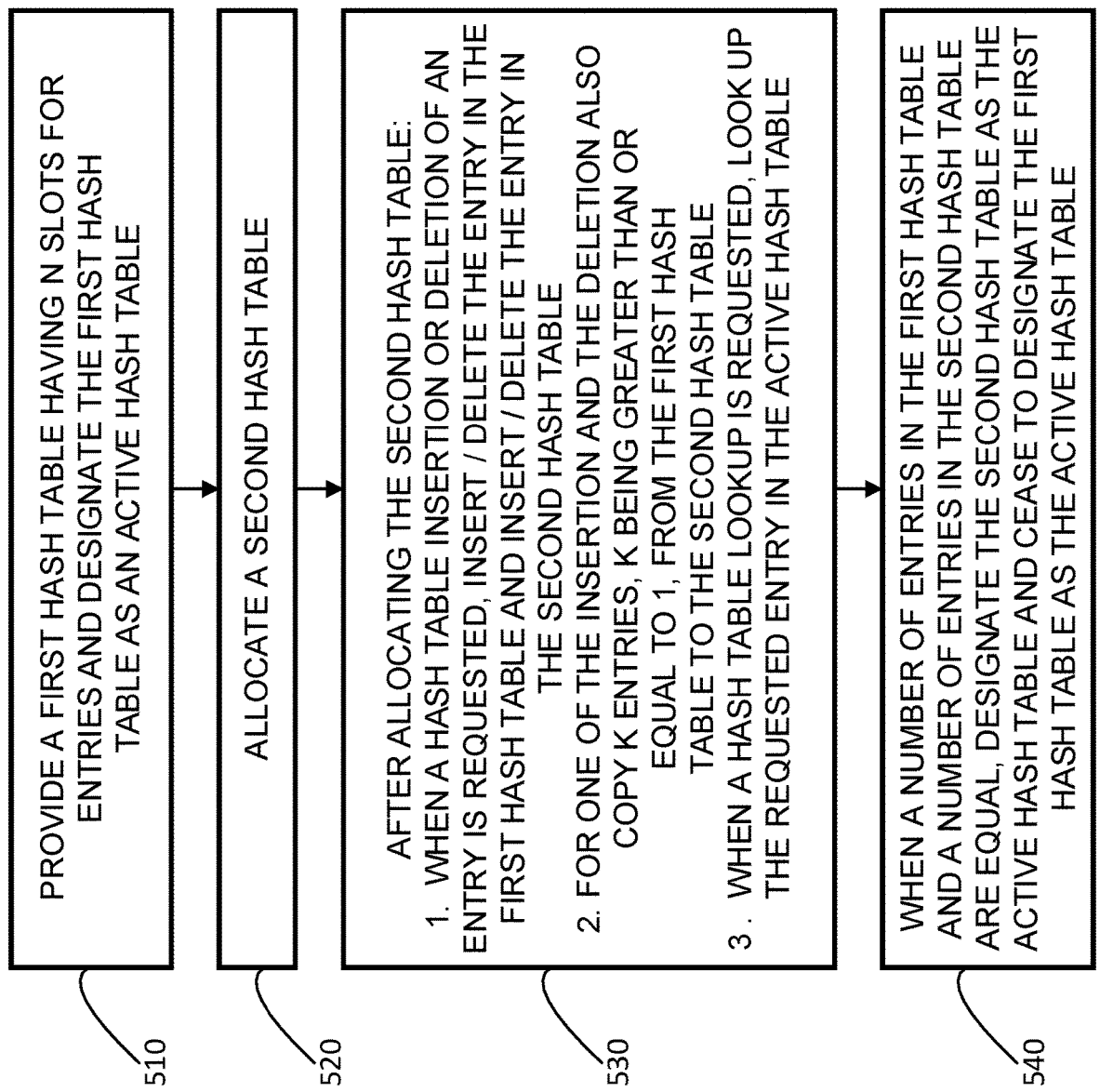
FIG. 5 is a simplified flow chart illustration of a method of operation of the apparatus of FIGS. 1-4.

Reference is now made to FIG. 5, which is a simplified flow chart illustration of a method of operation of the apparatus of FIGS. 1-4. The method of FIG. 5, which is largely self-explanatory in light of the above description of the apparatus of FIGS. 1-4, is further described as follows. In general, it is appreciated that some steps described in FIG. 5 may be optional or may occur in a different order than shown in FIG. 5.

In step 510, a first hash table (such as, by way of non-limiting example, the hash table 100 of FIGS. 1-4) is provided. The first hash table is designated (either in step 510, or before operation of the method of FIG. 5, or otherwise as appropriate) as an active hash table.

In step 520, a second hash table is allocated. Allocation of the second hash table may take place (as described above in a particular non-limiting example, with reference to FIG. 1 and FIG. 2) when occupancy of the first hash table reaches a threshold value.

Once the second hash table has been allocated, in step 530:
 1. When a hash table insertion or deletion is requested, the entry is inserted or deleted, as the case may be, both to/from the first hash table and to/from the second hash table.
 2. In addition (for one of the insertion and the deletion), k entries (k being greater than or equal to 1) are copied from the first hash table to the second hash table. One particular non-limiting example of determining a value of k is described above with reference to FIG. 3.
 3. When a hash table lookup is requested, look up of the entry takes place in the active hash table.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for optimizing hash table lookup speed during hash table resize on a computing device, the method comprising performing the following on the computing device:
    providing a first hash table having N slots for entries;
    designating the first hash table as an active hash table;
    allocating a second hash table; and
    performing the following after allocating the second hash table:

when a hash table insertion of an entry is requested, performing insertion by: inserting the entry to the first hash table and inserting the entry to the second hash table; and when a hash table lookup is requested, looking up the requested entry in the active hash table, wherein the performing insertion comprises: also copying K entries, K being greater than or equal to 1, from the first hash table to the second hash table, the method also comprising providing an enlargement ratio e and a threshold occupancy level of slots for the first hash table, the threshold occupancy level being equal to N multiplied by the enlargement ratio e, wherein the second hash table is allocated in response to a present occupancy level of the first hash table exceeding the threshold occupancy level, and the second hash table has more than N slots for entries.

2. The method according to claim 1 and wherein the performing the following after allocating the second hash table also comprises:

when a hash table deletion of an entry is requested, performing deletion by: deleting the entry from the first hash table and deleting the entry from the second hash table, and also copying K entries, K being greater than or equal to 1, from the first hash table to the second hash table.

3. The method according to claim 1 and wherein the second hash table has at least 2N+1 slots for entries.

4. The method according to claim 1 and wherein the second hash table has $$1 + \frac{1}{e} * N$$

entries.

5. The method according to claim 1 and wherein said performing the following after allocating the second hash table further comprises:

when a number of entries in the first hash table and a number of entries in the second hash table are equal, designating the second hash table as the active hash table and ceasing to designate the first hash table as the active hash table.

6. The method according to claim 5 and further comprising:

after said designating the second hash table as the active hash table, deallocating the first hash table.

7. A computing device comprising:
a processing unit; and
memory for storing a first hash table having N slots for entries,
the processing unit being configured for:
designating the first hash table as an active hash table;
allocating a second hash table; and
performing the following after allocating the second hash table:
when a hash table insertion of an entry is requested, performing insertion by: inserting the entry to the first hash table and inserting the entry to the second hash table; and
when a hash table lookup is requested, looking up the requested entry in the active hash table,
wherein the performing insertion comprises: also copying K entries, K being greater than or equal to 1, from the first hash table to the second hash table, wherein the processing unit is also configured for:
providing a threshold occupancy level of slots for the first hash table and an enlargement ratio e, the threshold occupancy level being equal to N multiplied by the enlargement ratio e, and
the second hash table is allocated in response to a present occupancy level of the first hash table exceeding the threshold occupancy level, and the second hash table has more than N slots for entries.

8. The computing device according to claim 7 and wherein the performing the following after allocating the second hash table also comprises:

when a hash table deletion of an entry is requested, performing deletion by: deleting the entry from the first hash table and deleting the entry from the second hash table, and copying K entries, K being greater than or equal to 1, from the first hash table to the second hash table.

9. The computing device according to claim 7 and wherein the second hash table has at least 2N+1 slots for entries.

10. The computing device according to claim 7 and wherein the second hash table has $$1 + \frac{1}{e} * N$$

entries.

11. The computing device according to claim 7 and wherein said performing the following after allocating the second hash table further comprises:

when a number of entries in the first hash table and a number of entries in the second hash table are equal, designating the second hash table as the active hash table and ceasing to designate the first hash table as the active hash table.

12. The computing device according to claim 11 and wherein said performing the following after allocating the second hash table further comprises:

after said designating the second hash table as the active hash table, deallocating the first hash table.

13. A computing device comprising:
a processing unit; and
memory for storing a first hash table having N slots for entries,
the processing unit being configured for:
designating the first hash table as an active hash table;
providing a threshold occupancy level of slots for the first hash table and a diminution ratio d, the threshold occupancy level being equal to N multiplied by the diminution ratio d;
allocating a second hash table in response to a present occupancy level of the first hash table reaching a level less than the threshold occupancy level, the second hash table having fewer than N slots for entries; and
performing the following after allocating the second hash table:
when a hash table insertion of an entry is requested, performing insertion by: inserting the entry to the first hash table and inserting the entry to the second hash table; and
when a hash table lookup is requested, looking up the requested entry in the active hash table, wherein the performing insertion comprises: also copying K entries, K being greater than or equal to 1, from the first hash table to the second hash table.

14. The computing device according to claim 13 and wherein the second hash table has $$d * N$$

entries.

15. The computing device according to claim 13 and wherein the performing the following after allocating the second hash table also comprises:
   when a hash table deletion of an entry is requested, performing deletion by: deleting the entry from the first hash table and deleting the entry from the second hash table, and copying K entries, K being greater than or equal to 1, from the first hash table to the second hash table.

16. The computing device according to claim 13 and wherein said performing the following after allocating the second hash table further comprises:
   when a number of entries in the first hash table and a number of entries in the second hash table are equal, designating the second hash table as the active hash table and ceasing to designate the first hash table as the active hash table.

17. The computing device according to claim 16 and wherein said performing the following after allocating the second hash table further comprises:
   after said designating the second hash table as the active hash table, deallocating the first hash table.

* * * * *